Nov. 5, 1957 F. DANIELS 2,812,303
ATOMIC POWER PLANT
Filed Oct. 11, 1945 3 Sheets-Sheet 1

Witnesses:
Herbert E. Metcalf
Walter L. Schlegel, Jr.

Inventor:
Farrington Daniels
By
Attorney

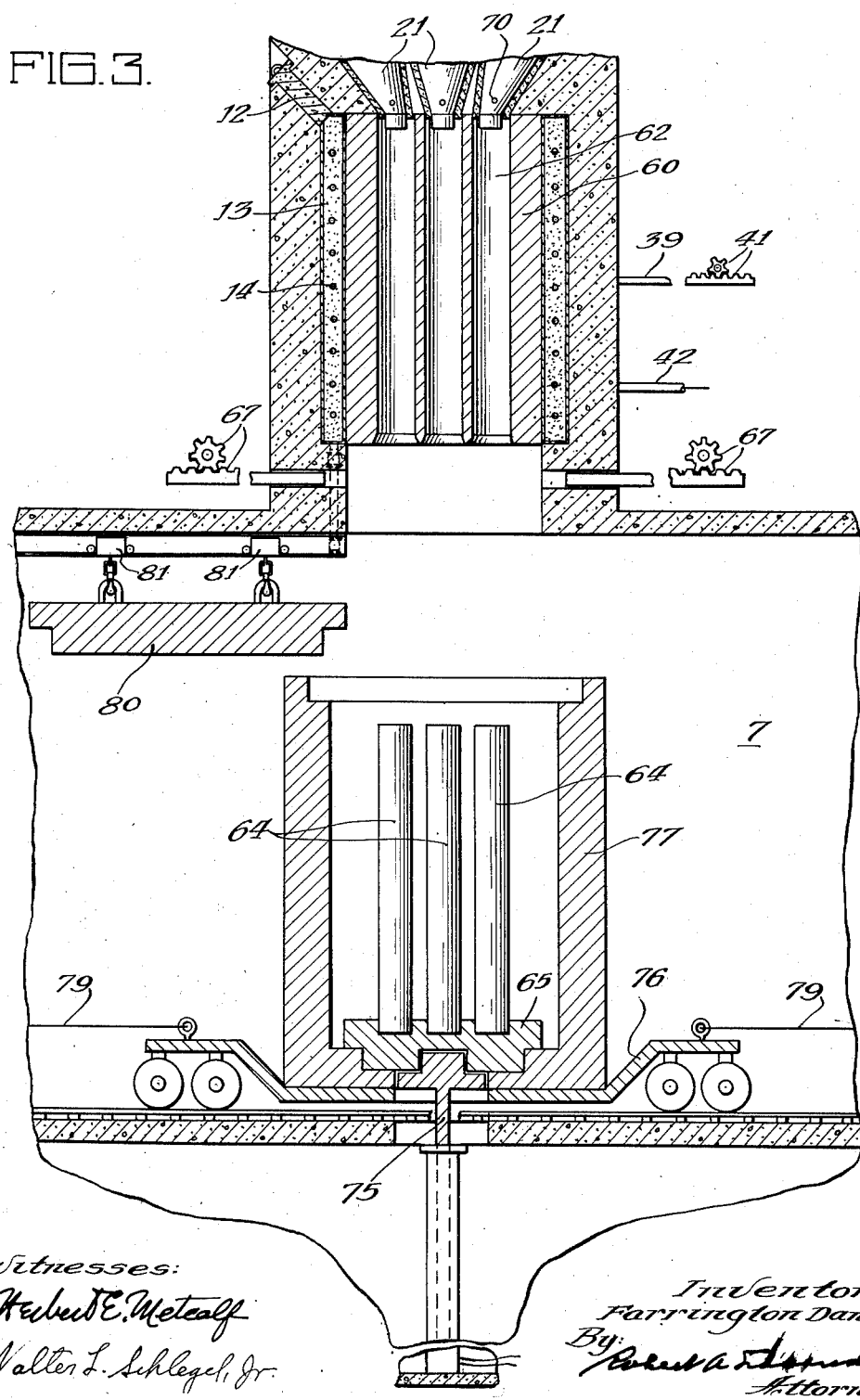

United States Patent Office 2,812,303
Patented Nov. 5, 1957

2,812,303

ATOMIC POWER PLANT

Farrington Daniels, Chicago, Ill., assignor to the United States of America as represented by the United States Atomic Energy Commission Application October 11, 1945, Serial No. 621,844

1 Claim. (Cl. 204—193.2)

The present invention relates to atomic power plants and more particularly to neutronic reactors from which heat can be removed to produce power in useful form.

In neutronic reactors a neutron fissionable isotope such as $U^{233}$, $U^{235}$ or $94^{239}$ or mixtures thereof is subjected to nuclear fission by absorption of slow neutrons, and a self-sustaining chain reaction is established by the neutrons evolved by the fission. In general such reactors have comprised bodies of compositions containing such fissionable material, such as for example, natural uranium, containing .7 percent of $U^{235}$ disposed in a regular geometrical pattern in a neutron slowing material or moderator. Graphite and beryllium are typical moderators suitable for such use. Heat is evolved during the fission reaction and is customarily removed by passage of a coolant through the reactor usually in heat exchange relationship with the uranium. In such reactors the transuranic element 94 (Pu) is formed as a by-product of the reaction. Specific details of the theory and essential characteristics of such reactors are set forth in copending application of Enrico Fermi and Leo Szilard, Serial No. 568,904, filed December 19, 1944 now Patent Number 2,708,656, issued May 17, 1955.

Both gases and liquids have been utilized as a coolant to carry away the heat of reaction, and are customarily forced through definite channels in the moderator in which the uranium is positioned. The arrangement of such channels is determined by the uranium body geometry, and for heat removal at high power outputs has usually required the coolant to be applied at relatively high pressures in order to force it through the channels in sufficiently large quantities to obtain a required temperature equilibrium. Such systems have required extensive pumping facilities. In such reactors, the temperature of the coolant, when liquids were used, has preferably been held well below the boiling point.

Expressed in broad terms the present invention provides a neutronic reactor in which the composition containing the fissionable isotope is bathed in a liquid having a low neutron capture cross section and preferably a liquid such as bismuth having an elevated boiling temperature. This liquid is vaporized by heat developed within the reactor and is condensed in a heat exchanger, the condensate being returned by gravity to the reactor for re-vaporization. Thus no pump is required and heat removal is efficient due to the absorption inside of the reactor, and the release outside of the reactor, of the latent heat of vaporization of the liquid. The heat thus obtained can be used, for example, to produce steam. The fissionable isotope may be in the form of natural uranium or may be used in substantially pure or concentrated form, or in compounds. In the first instance the fissionable isotope will be $U^{235}$ existing as a .7 percent of natural uranium, and in the latter case of fissionable isotope may be highly concentrated $U^{233}$, $U^{235}$ or $94^{239}$ or compounds thereof.

In consequence, an object of the persent invention is to provide a means and method of cooling a neutronic reactor by utilizing the latent heat of vaporization of a liquid.

Another object of the invention is to provide a means and method of cooling a neutronic reactor without the use of extensive pumping facilities.

Still another object of the invention is to recover for power the heat of reaction from neutronic reactors at an elevated temperature.

A different object of the invention is to provide a novel method and means for removing from the reactive composition gaseous products of nuclear reactions therein. These products are swept from the reactive composition by the vaporized coolant which is conducted therefrom in a manner hereinafter described in detail. It will be understood that many highly neutron absorbent materials such as xenon[135] are formed as the result of nuclear reaction within the reactor and by removing such materials from the reactor their "poisoning" effect upon the chain reaction is eliminated. Also many commercially valuable products of nuclear reactions are formed within the system, and these products when in gaseous form may be efficiently recovered from the reactive composition by the above mentioned sweeping action of the vaporized coolant.

Fig. 3 is a diagrammatic vertical sectional view on a reduced scale of the device of Fig. 2, showing loading and unloading facilities.

Figure 1:
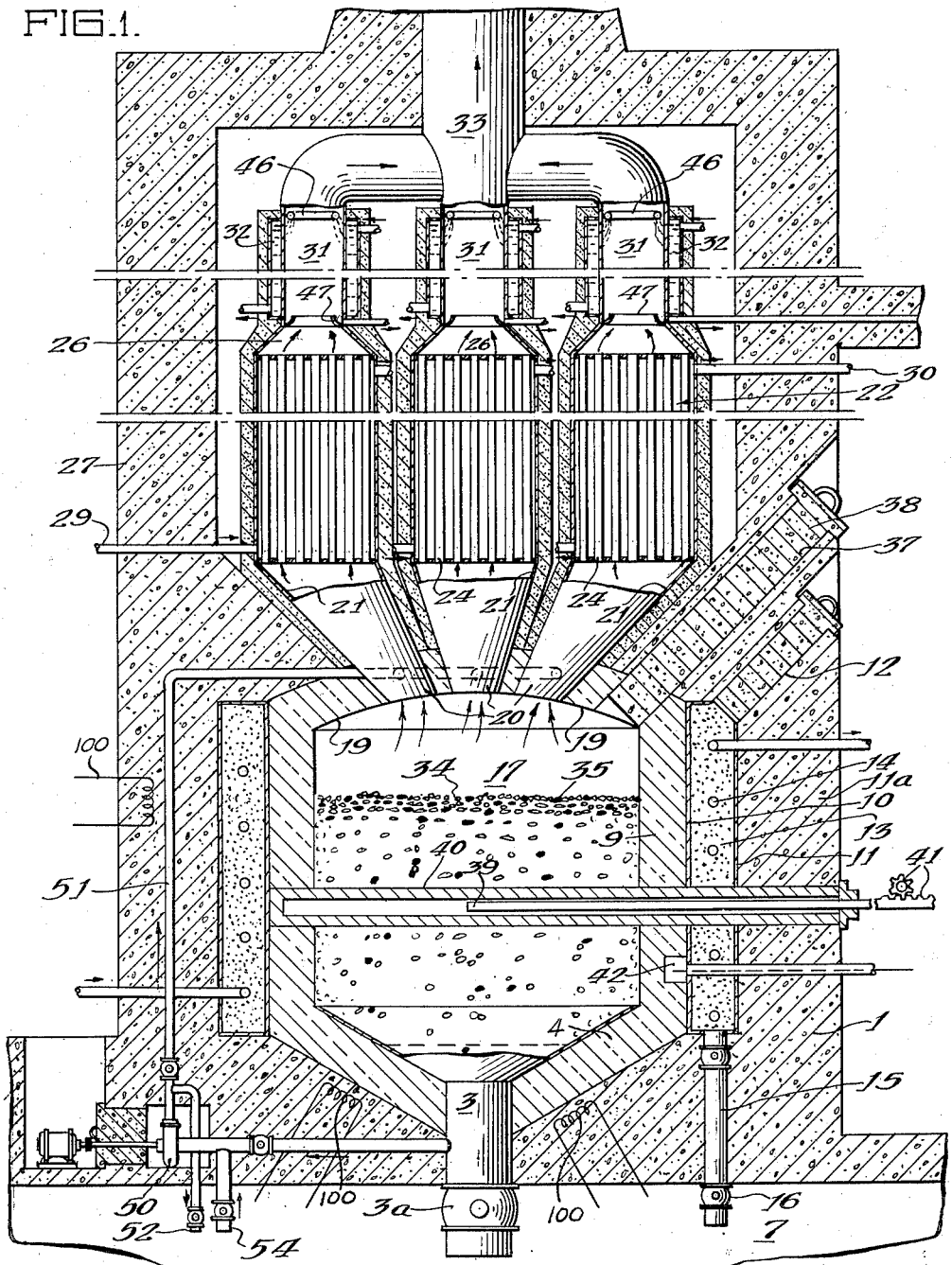
Fig. 1 is a diagrammatic vertical sectional view, partly in elevation, of one embodiment of the present invention utilizing a pebble bed type of reactor, broadly disclosed and claimed in my copending application, Serial No. 621,845, filed October 11, 1945.

Referring first to Fig. 1, showing one embodiment of the invention, a heavy concrete foundation 1 is provided, supporting a discharge pipe 3 controlled by an outlet valve 3a extending downwardly from a bottom reflector cone 4. Discharge pipe 3 extennds below the cone 4 into a discharge tunnel 7 positioned well below ground level. Extending upwardly from the periphery of cone 4 is a cylindrical reflector wall 9 of neutron reflecting material in the form of bricks or blocks. The reflector wall 9 is surrounded by a cylindrical inner metal tank wall 10 which is continued outwardly and horizontally at cone base level and then is turned upwardly to form a concentric outer tank wall 11 and is closed at the top except for a plugged absorber inlet 12. This provides a cylindrical absorption space 13 discharging into tunnel 7 through an absorber outlet pipe 15 and valve 16. Absorber space 13 is provided with cooling pipes 14 and may be filled with a slurry of thorium oxide and water, light or heavy, of about equal parts by weight. Outer tank wall 11 is then surrounded by concrete side walls 11a, five to ten feet thick, for example, erected on foundation 1. A cylindrical reactor space 17 is thus formed above the cone 4 in which a neutronically reactive composition is to be placed, as later described.

Above reactor space 17, a domed top 19 is provided of reflecting material having a plurality of flue holes 20 therein connecting with short flues 21. Each flue 21 exits into an insulated elongated boiler 22 in which gas tubes 24 are positioned. The flue gases pass through the tubes 24 to emerge at a top gas outlet 26. The boilers described may be heat absorbers of conventional design, as any modern elongated boiler adapted to handle hot gases of the temperature provided by the reactor will be satisfactory. The boiler 22 are grouped radially inside a concrete radiation shield 27 extended from the lower concrete walls 11a. Feed water inlets 29, and steam outlets 30 extend outwardly through radiation shield 27.

The gases leaving the boilers 22 enter elongated condensing chambers 31 cooled by water jackets 32, preferably to below 100° F., and are then manifolded into a stack 33.

The reactor space 17 is filled with a neutronically active composition consisting in this embodiment primarily of lumps or units of a neutron moderator 34, such as graphite, or sintered beryllium oxide, and lumps or units 35 of a material containing a fissionable isotope, such as uranium metal, uranium carbide or sintered uranium oxide. All of the latter units 35 contain $U^{235}$, a fissionable isotope.

These discrete units 34 and 35 are preferably of approximately the same size and shape. For example, rough spheres 1 to 3 inches in diameter are satisfactory and are loaded in random adjacent mix through loading opening 37 above the reactor space 17 to fill the reactor space 17. Thus multiple and intercommunicating voids are formed throughout the reactor. The overall volume ratio of moderator to uranium, however, is predetermined. A heat resistant shielding plug 38 closes opening 37.

Control of the reaction is provided by use, for example, of a control rod 39 of a material having high neutron absorption, such as cadmium, or boron in a gastight horizontal refractory sheath 40 of graphite or BeO. The control rod is operated by rack and pinion 41 to insert more or less of the absorber into the reactor as desired. The neutron density is monitored, for example, by an ionization chamber 42.

As it may be desirable to discharge some of the reactive units 34 and 35 from time to time, valve 3a can be operated in conventional manner from a remote location to drop a quantity of units 34 and 35 into shielded cars 45 operating on tracks 46 in tunnel 7. The units can thus be transported, if desired, to a chemical plant where the uranium is purified by removal of the residual radioactive fission products developed therein as the result of nuclear fission. Any element 94 produced by neutron absorption in the $U^{238}$ content of the uranium can also be removed chemically from the discharged units when desired. To compensate for the amount of material discharged from the bottom of the reactor, fresh material can be added to the top of the reactor through loading opening 37, thereby providing the proper amount of reactive composition in the recator at all times to insure the maintenance of the chain reaction.

The gas used as a heat transfer medium between the reactor and the boilers 22 is produced preferably as the result of boiling a liquid metal, such as bismuth, in the reactor during operation.

The bismuth, as a solid, may be initially loaded with units 34 and 35 and dispersed in lumps throughout the reacting composition. Upon operation of the reactor by withdrawal of the control rod 39, the bismuth, which melts at about 300° C., becomes liquid and settles to the bottom of the reactor. The reactor is then raised in power until the bismuth boils, about 1450° C., and thereafter the reactor will remain at that temperature. The bismuth vapor rises into the boilers 22, is condensed and falls by gravity back into the reactor to be revaporized. An excess of liquid bismuth is preferably provided, so that as all times during operation a pool of bismuth is present at the bottom of the reactor.

This excess liquid bismuth is circulated, being taken from discharge pipe 3 above valve 3a to enter a small pump 50 from which it is lifted in bismuth pipe 51 to be discharged just above flue openings 20 to fall back into the reactor. Liquid bismuth may be withdrawn by outlet pipe 52 extending into tunnel 7 from above pump 50, or inserted through bismuth inlet pipe 54 from tunnel 7.

In one specific example utilizing uranium carbide lumps and graphite lumps, the space occupied by the reacting composition can be a cylinder having the following dimensions:

| | |
|---|---:|
| Height _____ft__ | 36 |
| Diameter _____ft__ | 36 |
| Volume _____cu. ft__ | 36,000 |
| Weight of U component in fluid units_____tons__ | 100 |
| Weight of graphite units_____do____ | 860 |

Overall volume ratio 100 graphite–1 uranium

With 216 units per cubic foot, each with an area of .09 square feet, thus having a diameter of about two inches, there will be about 7,770,000 units with a total surface of about 669,000 square feet. About 3 tons of bismuth will be in the reactor at all times. Most of the heat of reaction is developed in the uranium carbide, but this heat is spread throughout the reactor by radiation, convection, and conduction. Due to the multiple, irregular and interconnecting channels provided by the many voids, the cross section for the vapor or liquid in the reactor can be considered as the cross section of the reactor, and at high temperatures the transfer of heat by radiation is important, as it tends to keep the entire reactor at a substantially uniform temperature, thus minimizing overheating of the center of the reactor where the neutron density and consequently heat release, is the greatest. There will, of course, be a vertical temperature gradient due to the entrance of the cooler liquid bismuth at the top of the reactor.

The reactor as above described will be just above critical size where the reproduction ratio is unity. When the control rod 39 is removed from the reactor, the neutron reproduction ratio in the reactor will be slightly above unity. With the control rod removed, the neutron density in the reactor rises, heat is developed, and the bismuth in the reactor is heated. When the desired operating power is reached with the bismuth boiling the control rod is inserted to reduce the neutron reproduction ratio to unity, thereby holding the reactor at the power attained at the end of the neutron density rise. Heating coils 100 in the foundation 1 are provided in the event it is desired to melt the bismuth after a long period of shutdown.

In case of failure of the control rod 39 to control the reaction, emergency measures can be taken by dumping a portion of the units by use of valve 3a.

About 96,000 kilowatts can be removed by the vaporization of about 100 liters per minute of bismuth, the vapor entering boilers 22 to give up some of its heat, and there to liquify and fall back into the reactor by gravity. The boiler temperature is adjusted by pressure regulation to remain constant at a value just above the solidifying temperature of bismuth.

About 4,000 kilowatts can be removed from the reactor by circulation of water in the absorber space cooling tubes 14 to provide a total power output of 100,000 kilowatts. This latter circulation can be used for preheating feed water to the boilers if desired.

It should be understood that units 34 and 35, while described as being roughly of spherical shape, can be of any shape, even highly irregular in surface, which when mixed will provide the desired intercommunicating voids and give the desired over-all volume ratio of moderator to uranium.

The use of the absorption space 13 positioned outside of the graphite reflecting layer will next be considered. In any power unit such as has just been described, the nuclear reaction fissions or "burns" the fissionable isotope $U^{235}$ at the start of the reaction. As the reaction continues the fissionable isotope $94^{239}$ is formed but usually not with unity conversion ratio, and is also fissioned. In conventional graphite-uranium reactors only about .80 atoms of $94^{239}$ are formed for each atom of $U^{235}$ destroyed by fission, a clear loss of fissionable isotope of 20 percent. As the total amount of uranium readily available in the world is presently thought to be limited (about 20,000 tons) the amount of $U^{235}$, existing only as .7 percent of natural uranium, is about 140 times less. In consequence, it is desirable to increase the fissionable isotope conversion factor as much as possible.

Irrespective of the presence of reflector 9, some neutrons are normally lost by escape beyond the reflector. While this loss varies with the size and composition of the reactor and reflector, 5 percent is a conservative figure. A large part of these normally lost neutrons can be absorbed in a non-fissionable isotope, such as thorium ($90^{232}$), for example, to produce the fissionable isotope $U^{233}$ according to the following process:

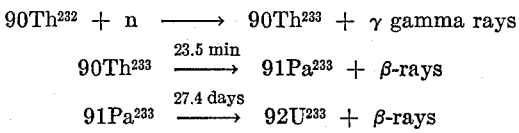

The thorium is placed in absorbing space 13 as $ThO_2$ powder or small lumps alone or mixed with water, light or heavy, or even graphite left there to absorb leakage neutrons, and removed at intervals in order that the $U^{233}$ produced may be chemically separated from the thorium. In this manner the ratio of fissionable isotope "burned" to fissionable isotopes formed is raised by a few percent by the $U^{233}$ production in the absorbing blanket.

So far, only the condensation of the bismuth vapors has been considered. There are, however, many other gases evolved from the reactor during operation.

In reactors operating at high neutron densities, such as the reactor presently described, radioactive elements of exceedingly high capture cross section may be formed relatively quickly in the uranium as an intermediate element in the decay chains of the fission fragments. This formation can change th neutron reproduction ratio during operation if these elements remain in the reactor. One of the most important of these decay chains is believed to be the 135 fission chain starting with Te (short)→I (6.6 hr.)→Xe (94.4 hr.)→Cs (20–30 yr.) →barium, the parenthetical times indicating half lives. The neutron absorption tellurium, iodine, caesium and barium is relatively unimportant, but the neutron capture cross section of radioactive $xenon^{135}$ has been measured to be about $2,500,000 \times 10^{-24}$ cm.$^2$, many times larger than that of stable gadolinium, for example, the cross section of which is about $30,000 \times 10^{-24}$ cm.$^2$. Upon absorption of a neutron, $xenon^{135}$ shifts to $xenon^{136}$, an element of relatively small capture cross section.

The rate of production of the Te and I is a function of the neutron density in which the uranium is immersed, and therefore dependent upon the power at which reactors of given type are operated. The radioactive $xenon^{135}$ is produced with a noticeable effect on the reaction, if not removed, a few hours after the reaction is started, and the effect is, of course, greater as the neutron density is increased and maintained. The $xenon^{135}$ effect in high power reactors can be summarized as follows, when all the xenon remains in the reactor.

The reaction is started by withdrawing the control rod. The neutron density rises at a rate determined by the reproduction ratio and thet effect of the delayed neutrons, until some predetermined neutron density is attained. The control rod is then placed in the unity reproduction ratio position and the reaction is stabilized at the power desired. During this time radioactive Te and iodine is formed, decaying to $xenon^{135}$. As more and more iodine decays, more and more $xenon^{135}$ is formed, this $xenon^{135}$ absorbing sufficient neutrons to reduce the reproduction ratio below unity. This absorption also converts the $xenon^{135}$ to $xenon^{136}$ which has no excessive capture cross section. The neutron density drops. If no compensation were made for this drop by the control rod, the density might drop until background conditions prevailed, and then the reaction might automatically start up as the $xenon^{135}$ decayed. Normally, the neutron density drop is compensated for by removal of the control rod to a new position where the reproduction ratio is again above unity. A neutron density rise occurs, bringing the density back to its former level. Again, more $xenon^{135}$ is formed and the process is repeated until an equilibrium condition is reached where the $xenon^{135}$ formed is transmuted by neutron absorption and by decay into isotopes of lower capture cross-section as fast as it is being formed. In the meantime, the control rod (or equivalent) has to be withdrawn by an amount necessary to remove from the reactor neutron absorbers at least equal in effect to the absorption caused by the $xenon^{135}$.

In the reactor as presently described, particularly when operated at high neutron densities, some of the Te, iodine and $xenon^{135}$ will be diffused out of the uranium into the cooling gas during operation. The diffused xenon, being non-condensible will be completely removed from the system by passage through the boilers, the condensers and the stack.

Other fission products, such as radioactive iodine, for example, will condensed on the inner walls of the condensers 31 and if the iodine remains there, it will decay into $xenon^{135}$ that will pass out the stack. Thus, the reactor described will not show a pronounced $xenon^{135}$ effect during operation.

In addition, fission fragments are projected into the bismuth, and/or its vapor, from the surface of uranium units. Many of these radioactive elements will be vaporized at the operating temperature of reaction and some of the elements will be condensed in condensers 31. Again, some of these same fragments, or their decay products formed inside the uranium units, will diffuse out of the units and be condensed in condensers 31. All such condensed fission products together with whatever solid bismuth may be present can be removed daily, for example, from the condensers 31 by washing down the inner condenser walls with a dissolving solution supplied through solution pipes 46 and the resultant liquid caught in ring baffles 47 and conducted outside the reactor. In this way at least a substantial portion of the chain poisoning by fission products will be eliminated from the reactor. If solid, non-condensible particles of fission fragments get by the condensers 31 into the stack, they can be collected by electrostatic precipitation as set forth in the hereinbefore cited copending application of mine.

The system above described utilizes natural uranium to supply the fissionable isotope for the reaction. However, when a substantially pure isotope such as $U^{233}$ or $94^{239}$ as produced by the neutronic reaction is available, it can be used in a somewhat similar system to generate power and to be likewise cooled by boiling bismuth. Such a system using plutonium as the fissionable isotope is shown in Figs. 2 and 3.

Figure 2:
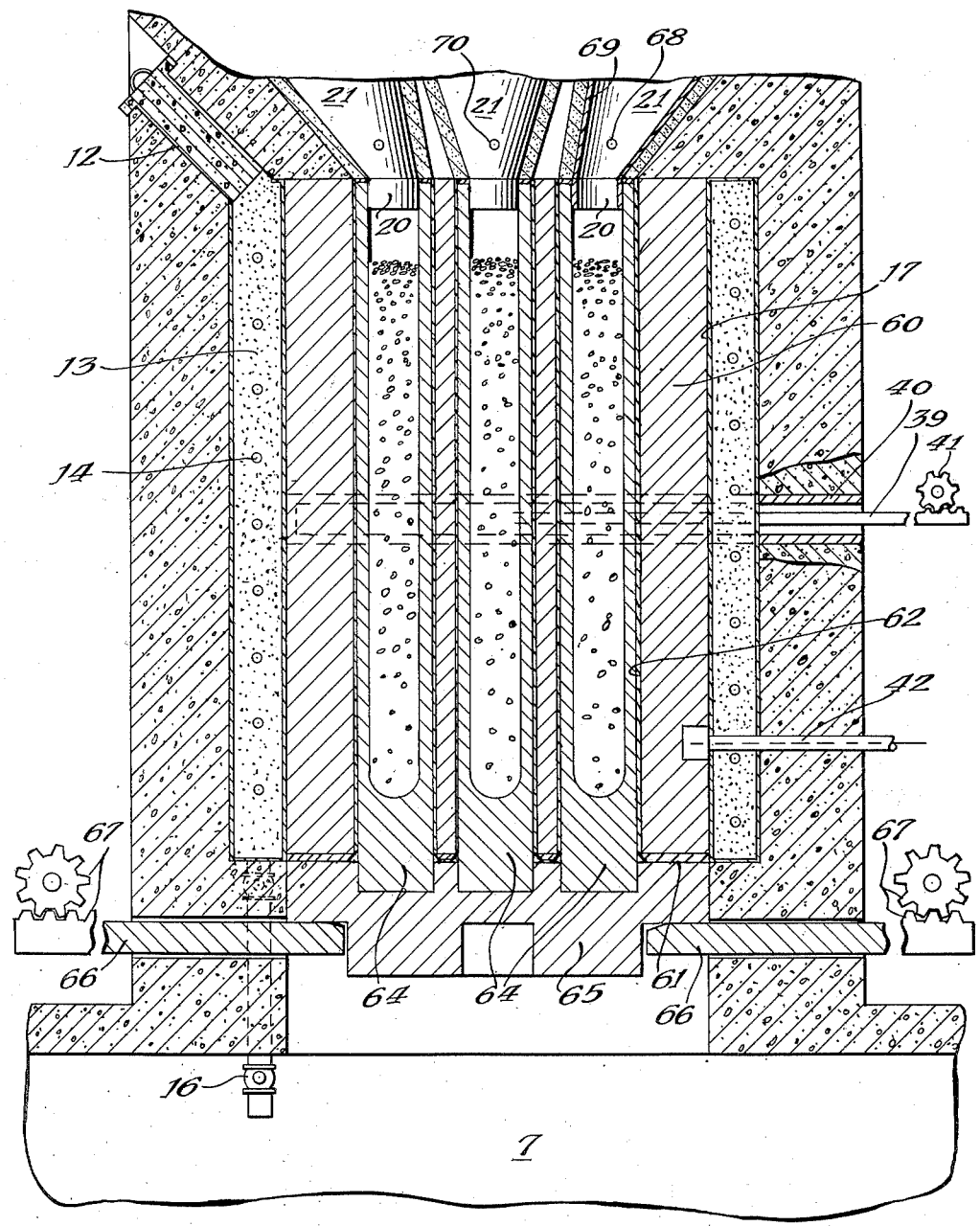
Fig. 2 is a diagrammatic vertical sectional view, partly in elevation, of another embodiment of the present invention.

Referring first to Fig. 2, the reaction space 17 is filled with a solid moderator 60, such as BeO, for example, in the form of bricks resting on a supporting bottom 61. A plurality of vertical bores 62 is left in the moderator 60 and in the bottom 61 in each of which is positioned a BeO crucible 64. These crucibles 64 are removably supported on a crucible platform 65 held beneath the bottom 61 by heavy radially arranged pins 66 withdrawable by use of rack and pinion units 67.

The crucibles 64 are open at their upper ends, and fit tightly around lips 20 of members 69 defining flue openings leading to boilers 22 condensers 31 and the stack 33, as in the embodiment previously described.

The crucibles 64, being about 12 inches internal diameter, are filled with liquid bismuth in which $PuO_2$ granules about 5 centimeters in diameter are dispersed. The density of the granules is adjusted to about 11 gms./Cm.$^3$ by adding $UO_2$ or BeO to the $PuO_2$. From five to ten kilograms of $PuO_2$ are required to sustain the chain reaction and the number of crucibles 64 or their spacing is not critical. Five to ten crucibles spaced five inches will be satisfactory. The BeO moderator 60 extending outwardly beyond the crucibles 64 provides the reflector.

The chain reaction can be started and maintained in such a reactor at a power level wherein the heat liberated in the PuO2 will boil the bismuth in the crucibles 64. The bismuth vapor will be condensed and recycled as in the first embodiment described and the power attained will be comparable to that attainable in the first embodiment of the invention. At 100,000 kilowatts about 100 grams of plutonium are consumed per day. Additional pellets of PuO2 are dropped into the crucibles 64 as needed through pipes leading to the flues, the pipe opening being shown at 70 in Figs. 2 and 3. Fission products diffused from the PuO2 will, as in the previous embodiment, pass out the stack or be deposited in condensers 31 (Fig. 1).

However, due to the accumulation of non-removable fission products in the plutonium and the bismuth, and because of the production of radioactive polonium by neutron absorption in the bismuth, it is desirable to remove the crucibles 64 at intervals for purification and decontamination of their contents. This is accomplished by the use of an elevator plunger 75 arising from the floor of tunnel 7 as shown in Fig. 3. Here a heavy car 76 is provided supporting a coffin 77, open at the top. Both the bottom of the coffin 77 and the floor of the car 76 are apertured to permit passage of the elevator plunger 75 therethrough. The plunger 75 is elevated through the car 76 and coffin 77 until it registers with and supports crucible platform 65, whereupon pins 66 are withdrawn and the platform 65, with its supported crucibles 64, is lowered into coffin 77. While in the coffin 77, platform 65 shields and closes the aperture therein. The plunger 75 is further withdrawn into the floor of the tunnel 7 until the car 76 can be moved on the tracks 46, as by cables 79. When the highly radioactive crucibles 64 are in the coffin 77, a top 80 is lowered thereon by hoists 81.

The crucibles 64 are then transported to a purification plant, the crucibles dumped and the contents sieved to separate the PuO2 granules from the bismuth. Both are purified and the crucibles recharged and replaced.

As the bismuth is also removable from the reactor of the first embodiment as desired, a desirable by-product, polonium, is recoverable therefrom. Polonium is a strong alpha ray emitter and useful as an activator for fluorescent materials.

Thus, by operation of the reactors shown, described and claimed herein, power in useful form can be obtained, the fissionable isotope $U^{233}$ is formed in the absorbing blanket, and the useful radioactive isotope polonium is recovered from the bismuth.

While the theory of the nuclear chain fission mechanism in uranium set forth herein is based on the best presently known experimental evidence, we do not wish to be bound thereby as additional experimental data later discovered may modify the theory disclosed.

What is claimed is:

In an atomic power plant, a right cylindrical chamber approximately 36 feet in diameter and approximately 36 feet in height, means therein for sustaining a nuclear fission chain reaction comprising about 7,770,000 roughly spherical units of uranium carbide and of graphite having a diameter of about two inches, the over-all volume ratio of graphite to uranium being approximately 100 to 1, bismuth metal permeating said chain reaction means and adapted to be vaporized by the heat of said reaction, a boiler connected to the top of said chamber, said boiler comprising a boiler tank and vapor tubes therethrough constructed and arranged to convey the vapor passing from said chamber, whereby the condensate within said tubes is returned by the action of gravity to said chamber, a condenser connected to the ends of the tubes opposite from the chamber ends of said tubes, means for removing fission product vapor condensate therefrom, and separate means attached to said condenser capable of removing fission product gases therefrom.

References Cited in the file of this patent

UNITED STATES PATENTS

| | | |
|---|---|---|
| Re. 21,781 | Toulmin, Jr. | Apr. 22, 1941 |
| 1,418,885 | Schulze | June 6, 1922 |
| 1,730,892 | Leslie | Oct. 8, 1929 |
| 2,127,193 | Toulmin, Jr. | Aug. 16, 1938 |
| 2,708,656 | Fermi et al. | May 17, 1955 |

FOREIGN PATENTS

| | | |
|---|---|---|
| 114,150 | Australia | May, 2 1940 |
| 86,139 | France | Oct. 28, 1940 |
| 233,011 | Switzerland | Oct. 2, 1944 |

OTHER REFERENCES

Goodman: "The Science & Eng. of Nuclear Power," vol. 1, p. 275, Addison-Wesley (1947).

Kelly et al.: Phy. Rev. 73 1135–9 (1948).

Pollard & Davidson: "Applied Nuclear Physics," 2nd ed., p. 256, John Wiley & Sons, Inc., N. Y. 1951.

Nucleonics, June 1953, pp. 18–23, 31.